Patented Oct. 20, 1931

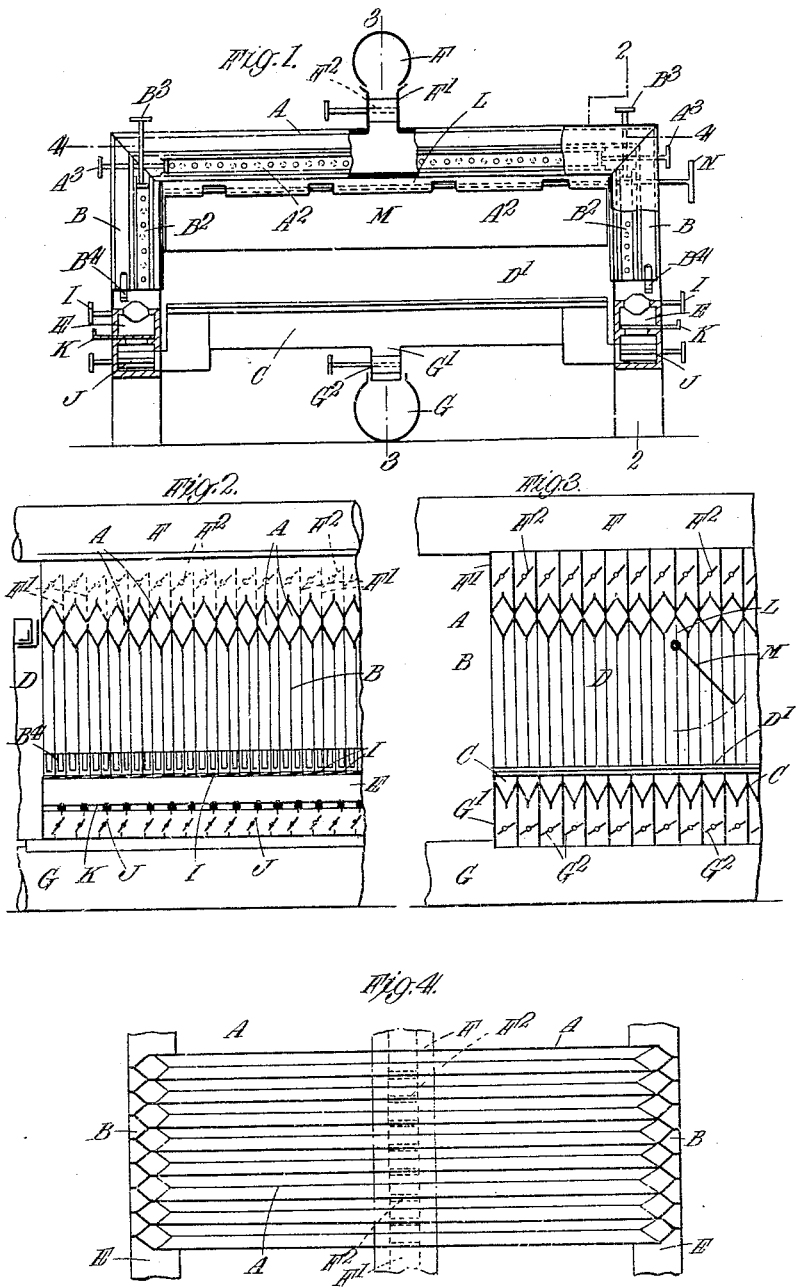

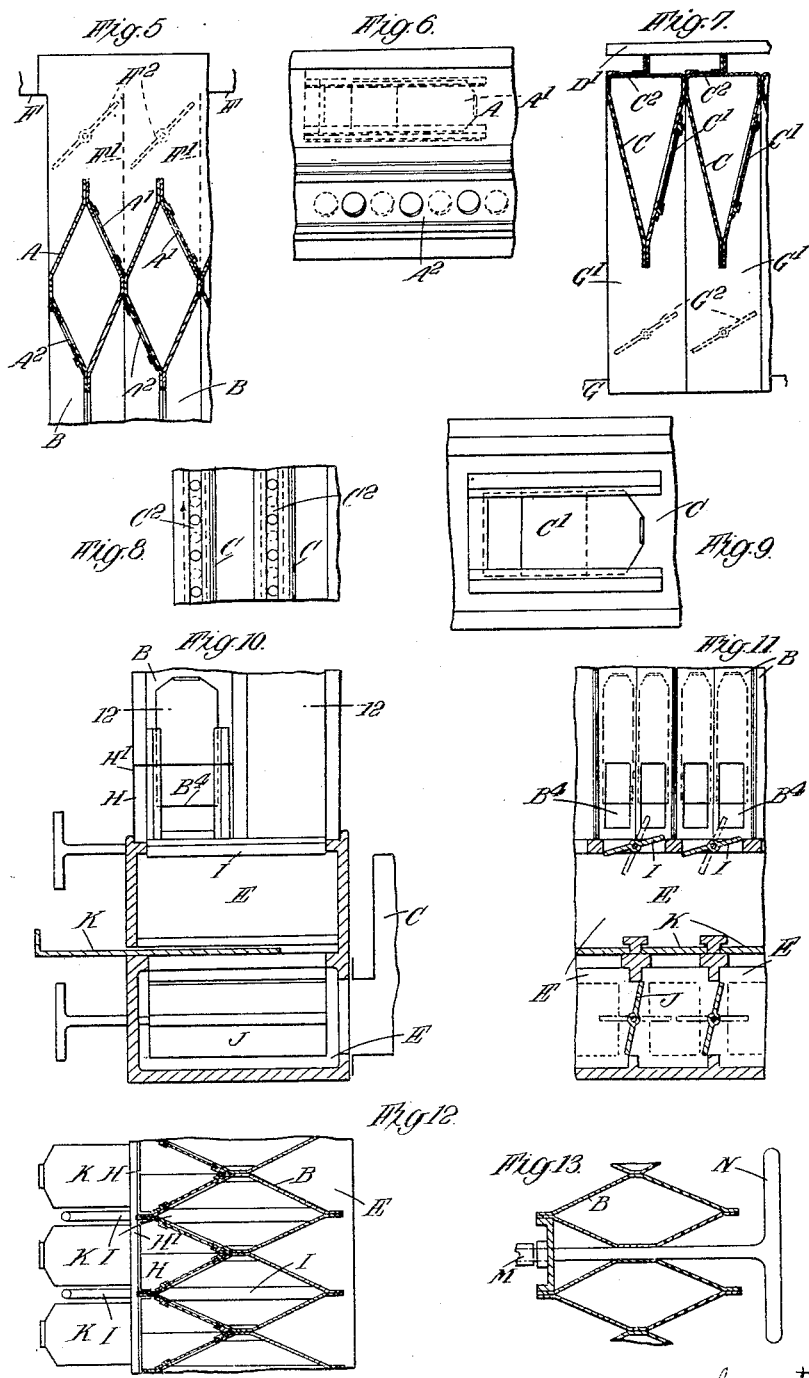

1,828,070

UNITED STATES PATENT OFFICE

ERIC AUGUSTUS COAD PRYOR, OF BECKENHAM, AND FRANCIS AGUSTUS HURLBUT, OF STRAND, ENGLAND, ASSIGNORS TO THE UNITED GLASS BOTTLE MANUFACTURERS LIMITED, OF LONDON, ENGLAND

GLASS ANNEALING LEER

Application filed October 27, 1927, Serial No. 229,095, and in Great Britain October 29, 1926.

This invention relates especially to glass annealing leers and similar apparatus. Hitherto the glass annealing practice has been based on the assumption that the rate of cooling of the glassware between the two temperatures usually known as the upper and lower critical annealing temperatures, must be comparatively slow, and that when the lower critical temperature has been reached the rate of cooling can be accelerated so as to be comparatively rapid. The rapid rate of cooling below the lower critical temperature is generally accomplished by air currents within the leer, so that the ware is cooled by conduction as well as by radiation to the sides of the leer.

According to the present invention the ware is cooled rapidly from temperatures considerably above the lower critical temperature without the introduction of an injurious degree of strain therein, the cooling taking place uniformly—that is, without local fluctuations in temperature. This may be accomplished by excluding as far as possible all draughts or air currents in the tunnel or passage through which the ware is travelling, and by making provision for enabling the ware to be cooled by uniform radiation as far as is practicable in transverse or mainly transverse directions in other words by uniform radiation to the tunnel exterior or casing which may be cooled, if desired, externally in any appropriate manner. By such means large glass bottles or similar ware can be cooled from temperatures exceeding 500° C. at a rate hitherto considered to be impracticable without imposing injurious permanent strain in the bottles, and without causing cracking—provided always that the heat is radiated uniformly as previously stated. For example, it is possible according to this invention to cool large bottles from 500° C. to room temperatures in about twenty minutes. For the purpose of this invention, we provide a muffle leer which is constructed at the portion beyond and adjacent to the fire box of a material of high thermal conductivity, such as sheet metal, to permit of rapid and uniform heat radiation from its external surface. This sheet metal portion which may comprise the arch or roof and sides of the tunnel and the hearth or floor of the tunnel may be cooled externally and means may be provided whereby it is wholly or partly surrounded by a casing or outer wall or the like to form a space or passage for the cooling or temperature controlling medium. It is essential for rapid annealing that the rate of cooling at all points on the annealing curve shall be correctly adjusted and for that purpose the leer is constructed with facilities for extracting from or supplying heat to any part along the length thereof as hereinafter described. The space or passage for the cooling or temperature controlling medium, may be divided up into sections across the leer to provide a number of transverse compartments along the whole or along part of the length of the leer at any desired position. The said compartments may be connected to a common inlet or supply pipe, say one for a series of compartments forming the arch or roof and sides of the leer tunnel and one for a series of compartments forming the hearth or bottom of the tunnel whilst all the said compartments may be connected to a common outlet duct disposed at and along the bottom of each series of the side compartments in a convenient position for communication with the hearth compartments and the said side compartments which as previously stated are in communication with the roof compartments. Suitable controlling means such as valves, dampers, slides or the like may be provided for controlling the sections or compartments separately or in groups or collectively for regulating the passage or flow of the temperature controlling medium or the like and provision may be made for admission of outside air or other gas to mix with the temperature controlling medium or hot gases in any compartment or compartments. Means may also be provided whereby any one or more of the said compartments can be placed in communication with the interior of the leer tunnel at any desired part along the length thereof, for the extraction or introduction of heat. Means may be provided whereby a cooling medium may be introduced into the tunnel so as to pass along the same and to escape through openings in the transverse compartments, and in this connection baffles or curtains or similar devices may be provided to limit the flow or effec. of such cooling medium. Although the said transverse compartments are separate as aforesaid and separately controlled, for the passage of the medium or the like through the compartments in parallel, means may be provided for placing any number of the compartments in direct communication or in series to provide a continuous flow or passage through the compartments so connected along any desired length and in either direction along the leer. The construction of the leer with the transverse compartments at the portion adjacent to the position where the lower critical temperature is reached is mainly used for the introduction of the cooling medium for effecting the rapid cooling of the ware from temperatures say exceeding 500° C. but the construction is such that hot and cold sections can be provided at any positions along the leer. The transverse compartments may be constructed as separate sections which may be of diamond or other shape in cross section say for the arch or roof and sides and of half diamond shape for the hearth sections, these sections being so constructed that expansion joints along the leer are avoided, whilst they afford increased radiating and cooling surfaces.

In order that the said invention may be clearly understood and readily carried into effect, the same will now be described more fully with reference to the accompanying diagrammatic drawings, in which:—

Figure 1 is a cross sectional view of one construction of glass annealing leer embodying the present invention.

Figure 2 is a longitudinal sectional view of part of the leer taken on the line 2—2 of Figure 1.

Figure 3 is a longitudinal sectional view of part of the leer taken on the line 3—3 of Figure 1.

Figure 4 is a sectional plan view of part of the leer taken on the line 4—4 of Figure 1.

Figures 5 and 6 are respectively a longitudinal sectional view and a transverse view of part of the roof of the leer drawn to an enlarged scale.

Figures 7, 8 and 9 are respectively a longitudinal sectional view, a plan view and a transverse view of part of the hearth of the leer, drawn to an enlarged scale.

Figure 10 is an enlarged cross sectional view of the lower part of one of the side walls of the leer.

Figure 11 is a side sectional view of that portion of the leer illustrated in Figure 10.

Figure 12 is a sectional plan view taken on the line 12—12 of Figure 10.

Figure 13 is a detail view hereinafter referred to.

The leer may be of any suitable construction at the fire box end where the ware is introduced into the leer tunnel. At a position beyond the fire box and for any desired length along the leer the tunnel comprises a sheet metal roof A, sheet metal sides B and a sheet metal hearth C each of which comprises an inner wall or casing adjacent to the tunnel or passage through which the ware is conveyed, and an outer wall or casing so that the arch or roof, the sides and the hearth are of hollow formation. D indicates the tunnel or space through which the ware is caused to travel from the fire box or entry end to the the exit end, for example by means of a conveyor $D^1$ shown in Figures 1 and 3. The roof A and the sides B are constructed in the form of adjoining transverse sections or compartments each section or compartment in the example shown being of diamond shaped cross section, so that a series of such diamond shaped sections or compartments which are connected at their middle parts as shown in Figure 5 are transversely disposed along the top of the space D and at their ends are connected to and communicate with the vertical side compartments B of similar section as shown in Figure 4. The lower ends of the side sections or compartments B are connected to and are in communication with ducts or conduits E which at a convenient position may communicate with each other and may be connected to a fan or exhauster. The hearth C of the leer in the example shown is constituted by a series of adjoining and suitably connected transverse sections or compartments of half diamond shape (see Figures 3 and 7) which extend across the bottom of the space D below the conveyor $D^1$ and communicate at their ends with the aforesaid side ducts or conduits E. Extending long the upper part of the roof compartments or sections A, is conduit or pipe F which is in communication with the separate compartments A by means of independent or separate pipes, passages, openings or the like $F^1$ in which are controlling dampers $F^2$ that enable communication to be established or cut off between the pipe F and any of the roof sections or compartments A which as aforesaid communicate with the side compartments B. Hot or cold temperature controlling medium may be supplied from the pipe F into any one or more of the sections or compartments A at any part of or position along the length of the leer by opening the required dampers $F^2$ and the said temperature controlling medium passes through the compartments A into the communicating side compartments B and then into the ducts or outlet pipes E from which the said medium may be drawn by a fan or the like if desired. On the outer wall of each section or compartment A one or more slides $A^1$ may be provided for controlling openings in the said wall for the admission of outside air into the compartments A and B for cooling purposes or for mixing with and diluting the hot gases if desired or for any other purpose. Below the hearth sections or compartments C is a longitudinally disposed conduit or pipe G which communicates with each of the compartments through pipes or passages $G^1$ that are controlled by dampers $G^2$ so that temperature controlling medium can be supplied from the said pipe G into any one or more of the sections C at any desired position by opening the required dampers $G^2$, the said gases or medium passing along the transverse hearth compartments C into the ducts or outlet pipes E. On the outer walls of each of the hearth compartments C one or more slides $C^1$ can be provided for controlling openings for the admission of outside air into the compartments C as and when required. By such construction, the temperature controlling medium can be caused to pass through the roof and the side walls at any desired section or part of the length of the leer in directions at right angles to the travel of the ware through the tunnel D and the controlling dampers may be separately operated or they may be connected so as to enable groups or several of them to be operated together. On the inner wall of each of the roof compartments A and also on the inner wall of each of the side wall compartments B if desired, are mounted slides $A^2$ and $B^2$ provided with handles $A^3$ and $B^3$ and formed with holes that can be brought into register with a series of holes in the said inner walls from a non-registering or closed position so as to place the interior space D of the leer tunnel in communication with any one or more of the compartments A or B. Slides $C^2$ having holes for registering with holes in the upper parts or inner walls of the hearth compartments C (see Figures 7 and 8) may be provided for establishing communication between the tunnel space D and any one or more of the said hearth compartments C. The said slides $A^2$, $B^2$ and $C^2$ may be used for enabling hot air to be extracted from the tunnel space D and for the introduction of cold air into the said space at any desired section or part of the leer according to requirements.

The compartments B may be put into direct communication with each other at their lower parts, and cut off from direct communication with the duct E by means which are illustrated more particularly in Figures 10, 11 and 12. On the outsides of the lower parts of the compartments B transfer chambers H are formed by means of plates $H^1$ and adjacent to these chambers, valve controlled openings or ports $B^4$ are provided in the outer walls of the compartments B. At the lower ends of the compartments B, hand operated dampers I are provided to close or establish communication with the adjacent duct E. When these dampers I are closed and the ports $B^4$ in the said compartments B are opened as shown in Figure 11 hot air or the like from the interior of the tunnel can flow from one compartment B into the next without entering the duct E. For enabling the hearth compartments C to be placed in direct communication with each other, dampers J are provided at the ends of these compartments and sliding valves K are provided in suitable guides in the ducts E. When the sliding valves K are closed and the damper J between any two compartments C is opened hot air or the like can be drawn from one of the compartments into the next. When however the sliding valves K are opened the compartments C are in direct communication with the duct E. By such an arrangement of dampers and the like for placing any of the sections B (or any of the sections C) in direct communication with each other hot air may be extracted from the interior of the leer through the directly communicating compartments, and it can be discharged through the outer opening controlled by the slides $A^1$ or $C^1$ in the last of the directly connected compartments. Owing to the diamond shape of the compartments A and B and the half diamond shape of the compartments C the inner and outer walls of the former and the outer walls of the latter provide increased radiating surfaces. The connection of the different sections or compartments at the middle parts as shown enable the connected series of the compartment to expand or contract as a whole so that expansion or sliding joints are unnecessary.

By the regulation of the various dampers or controls, hot or cold sections may be obtained along the leer as required and by suitably controlling the compartments or sections at the required positions it is possible to maintain a temperature gradient whereby the ware may be cooled from temperatures up to or exceeding 500° C. in a comparatively short space of time. It is possible to effect rapid cooling at a position adjacent to the fire box end of the leer from temperatures above the usual lower critical temperatures and for this purpose cooling medium may be supplied to certain of the sections or compartments A and B near the fire box end of the leer so that uniform radiation of heat can take place for effecting the rapid cooling without imposing injurious permanent strain in the ware. The various controlling dampers and valves would be suitably arranged to enable this part of the leer to be cooled as aforesaid. The cooling may be effected by the use of any suitable temperature controlling medium in the aforesaid compartments A and B and in the compartment C if desired, and the uniform radiation can take place transversely to the roof and sides or to the roof and sides and the hearth. For cooling at temperatures below the lower critical annealing temperature it may be found desirable to provide means for introducing air or producing draughts or air currents within the leer in order to accelerate the cooling, since cooling by radiation alone is only rapid at high temperatures. Cooling air or the like may therefore be introduced into the tunnel to travel along the same for example from the exit end to any desired position along the tunnel and means are provided to prevent the air or draughts from reaching the part of the tunnel where rapid cooling by uniform radiation is taking place. For this purpose a transverse plate L is disposed in the tunnel at a position above the tallest ware that would pass through. An adjustable baffle or curtain plate M is hinged to the said plate L in such manner that it can be moved by a handle N into a position just above the top of the ware so as to close the space in the tunnel above the ware and thus prevent the air passing into and along the tunnel from reaching the part where rapid cooling by uniform radiation is taking place. The air introduced into the tunnel escapes through any one or more of the interior openings $A^2$, $B^2$ or $C^2$ and the outer openings $A^1$, $B^1$ or $G^1$ on the exit or cold side of the tunnel beyond the aforesaid adjustable baffle or curtain plate M.

The construction according to this invention may be usefully applied to kilns, stoves, furnaces, and the like, for the heat treatment of material of all description.

Existing leers may be modified or improved by constructing the portion of the leer between the fire box and the position at which rapid cooling usually commences to take place, in the manner described above, to permit of rapid heat radiation in the early stages as hereinbefore described.

What we claim and desire to secure by Letters Patent of the United States is:—

1. A glass annealing leer comprising a tunnel constituted by transversely disposed adjoining but independent metal sections or compartments providing passages for the temperature controlling medium entirely around the tunnel at right angles to the direction of travel of the ware through the tunnel, means whereby each compartment may be placed in communication with other of the compartments and independently operated controlling means whereby the temperature conditions within the leer tunnel adjacent to each section can be controlled as desired.

2. A glass annealing leer, comprising a tunnel constituted by transverse adjoining metal compartments, a common conduit for the supply of temperature controlling medium, separate passages leading from said conduit to the transverse compartments, and independently operable controlling means in said passages for regulating the flow of the temperature controlling medium.

3. A glass annealing leer, comprising a tunnel constituted by transverse compartments, a common conduit for the supply of temperature controlling medium connected to the several compartments by separate controllable passages, a common duct or ducts for the outflow of the temperature controlling medium from the said compartments, and independently operated controlling dampers controlling the passage of the said medium into said duct or ducts.

4. A glass annealing leer, comprising a tunnel constituted by independent transverse compartments, through which compartments the temperature controlling medium can pass, and means whereby any number of said compartments can be placed in direct communication with each other at any position along the leer.

5. A glass annealing leer, comprising a tunnel constituted by transverse compartments having openings that can be controlled to establish communication with outside air when desired and also having openings that can be independently controlled for establishing communication with the interior of the tunnel.

6. A glass annealing leer, comprising transverse compartments adapted to form the roof and sides of a tunnel, transverse compartments adapted to form the bottom of said tunnel, said last named compartments being independent of the roof and side compartments, means whereby the two sets of compartments can be independently supplied with temperature controlling medium, and means whereby the outflow of said medium, from the two sets of compartments is effected through common outlet ducts.

7. A glass annealing leer, comprising a series of transverse metal compartments arranged to form the roof and sides of a tunnel, a series of transverse metal compartments arranged to form the bottom of said tunnel, a supply conduit for temperature controlling medium in communication with the roof and side compartments by separate and independent controllable passages, a supply conduit connected to the bottom compartments by separate and independently controllable passages, outlet ducts communicating with the ends of the said compartments for the outflow of the temperature controlling medium, and controlling means associated with said outlet ducts.

8. A glass annealing leer, comprising a series of transverse metal compartments arranged to form the roof and sides of a tunnel, a series of transverse metal compartments arranged to form the bottom of said tunnel, a supply conduit for temperature controlling medium in communication with the roof and side compartments by separate and independent controllable passages, a supply conduit connected to the bottom compartments by separate and independently controllable passages, outlet ducts communicating with the ends of the said compartments for the outflow of the temperature controlling medium, controlling means associated with said outlet ducts, and means whereby any number of the roof and side compartments or the bottom compartments can be cut off from the outflow duct and placed in direct communication with each other.

9. A glass annealing leer, comprising a series of transverse metal compartments arranged to form the roof and sides of a tunnel, a series of transverse metal compartments arranged to form the bottom of said tunnel, a supply conduit for temperature controlling medium in communication with the roof and side compartments by separate and independent controllable passages, a supply conduit connected to the bottom compartments by separate and independently controllable passages, outlet ducts communicating with the ends of the said compartments for the outflow of the temperature controlling medium, controlling means associated with said outlet ducts, means whereby any number of the roof and side compartments or the bottom compartments can be cut off from the outflow duct and placed in direct communication with each other, and dampers or valves for controlling openings in the inner and outer walls of the said compartments, whereby communication may be established with outside air through the openings in the outer walls when desired and with the interior of the tunnel through the openings in the inner walls when desired.

10. A glass annealing leer, comprising a series of transverse metal compartments arranged to form the roof and sides of a tunnel, a series of transverse metal compartments arranged to form the bottom of said tunnel, a supply conduit for temperature controlling medium in communication with the roof and side compartments by separate and independent controllable passages, a supply conduit connected to the bottom compartments by separate and independently controllable passages, outlet ducts communicating with the ends of the said compartments for the outflow of the temperature controlling medium, controlling means associated with said outlet ducts, means whereby any number of the roof and side compartments or the bottom compartments can be cut off from the outflow duct and placed in direct communication with each other, dampers or valves for controlling openings in the inner and outer walls of the said compartments, whereby communication may be established with outside air through the openings in the outer walls when desired and with the interior of the tunnel when desired, a hinged plate located within the tunnel for preventing a medium in any part of the tunnel from passing into another part thereof, and exterior operating means by means of which the said plate can be set to suit the height of the ware passing through the tunnel.

ERIC AUGUSTUS COAD PRYOR.
FRANCIS AGUSTUS HURLBUT.